(12) United States Patent
Rhee

(10) Patent No.: US 7,159,052 B1
(45) Date of Patent: Jan. 2, 2007

(54) CONFIGURABLE ARCHITECTURE FOR VIRTUAL SOCKET CLIENT TO AN ON-CHIP BUS INTERFACE BLOCK

(75) Inventor: Que-Won Rhee, Palo Alto, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 643 days.

(21) Appl. No.: 09/432,819

(22) Filed: Nov. 2, 1999

(51) Int. Cl.
*G06F 13/00* (2006.01)

(52) U.S. Cl. .......................... 710/62; 710/64; 710/72; 710/305; 710/63

(58) Field of Classification Search ............ 710/62–65, 710/72, 305–315; 713/400; 716/1, 7, 19
See application file for complete search history.

(56) References Cited

U.S. PATENT DOCUMENTS

| | | | | |
|---|---|---|---|---|
| 5,778,237 A | * | 7/1998 | Yamamoto et al. ......... | 713/300 |
| 5,870,310 A | * | 2/1999 | Malladi ....................... | 716/19 |
| 5,915,103 A | * | 6/1999 | Chambers et al. ............ | 703/21 |
| 5,991,817 A | * | 11/1999 | Rowett et al. .............. | 370/392 |
| 6,108,738 A | * | 8/2000 | Chambers et al. .......... | 710/107 |
| 6,185,641 B1 | * | 2/2001 | Dunnihoo ................... | 370/402 |

* cited by examiner

*Primary Examiner*—Ilwoo Park

(57) ABSTRACT

An interface block provides an interface between an internal bus of an integrated circuit and a socket of a logic block. The interface block includes a synchronization module that performs any needed synchronization between a clock domain of the internal bus and a clock domain of the socket of the logic block. A translation module provides translation of block encoding of the data for data transferred between the internal bus and the socket of the logic block. A queue module buffers data flowing between the internal bus and the socket of the logic block. A driver module handles low level and electrical drive specifications of the internal bus.

6 Claims, 6 Drawing Sheets

CONFIGURABLE ARCHITECTURE FOR VIRTUAL SOCKET CLIENT TO AN ON-CHIP BUS INTERFACE BLOCK

BACKGROUND

The present invention concerns the interface between two busses and pertains specifically to a configurable architecture for virtual socket client to an on-chip bus interface block.

Within an integrated circuit, it is sometimes necessary to provide an interface between a port of a specialized logic block and an on-chip bus. For example the specialized logic block is proprietary to a particular vendor.

It is difficult and time consuming to design an efficient interface between a port of a specialized logic block and an on-chip bus. Further, any variation in the configuration requirements of the interface can require a complete redesign of the interface.

Modifying a specialized logic block may introduce errors and requires extensive internal knowledge and re-verification time. Efficient block re-use needs flexible glue logic to connect blocks with little or no modifications.

SUMMARY OF THE INVENTION

In accordance with the preferred embodiment of the present invention, an interface block provides an interface between an internal bus of an integrated circuit and a socket of a logic block. The interface block includes a synchronization module that performs any needed synchronization between a clock domain of the internal bus and a clock domain of the socket of the logic block. A translation module provides translation of block encoding of the data for data transferred between the internal bus and the socket of the logic block. A queue module buffers data flowing between the internal bus and the socket of the logic block. A driver module handles low level and electrical drive specifications of the internal bus.

In one embodiment of the present invention, a plurality of buffers is used to pipeline the interface block. For example, a first buffer is located between the synchronization module and the translation module, a second buffer is located between the translation module and the queue module, and a third buffer is located between the queue module and the driver module.

Each of the modules can be individually customized as needed. For example, the synchronization module can be implemented as a null synchronization block where no synchronization is required between clock domains, as a ratio synchronization block where the clock domain of the internal bus is related to the clock domain of the socket of the logic block by a fixed multiplier ratio, or as a full synchronization block where there is no phase relationship between the clock domain of the internal bus and the clock domain of the socket of the logic block.

Customization of interface blocks enables the interface block to be compatible with a variety of different proprietary logic blocks and on-chip busses, as well as to accommodate system design goals. Modularity of the interface block enables rapid assembly while still being tuned for a particular application. These features make this architecture especially suited for rapid, system-on-chip implementations because of the inherent isolation of a specialized logic block and the electrical bus protocol in a rapidly configurable system.

BRIEF DESCRIPTION OF THE DRAWINGS

FIG. 1, FIG. 2, FIG. 3, FIG. 4, FIG. 5, and FIG. 6 are block diagrams that illustrate the architecture used for the interface shown in FIG. 2 in accordance with various preferred embodiments of the present invention.

DESCRIPTION OF THE PREFERRED EMBODIMENT

Figure 1:
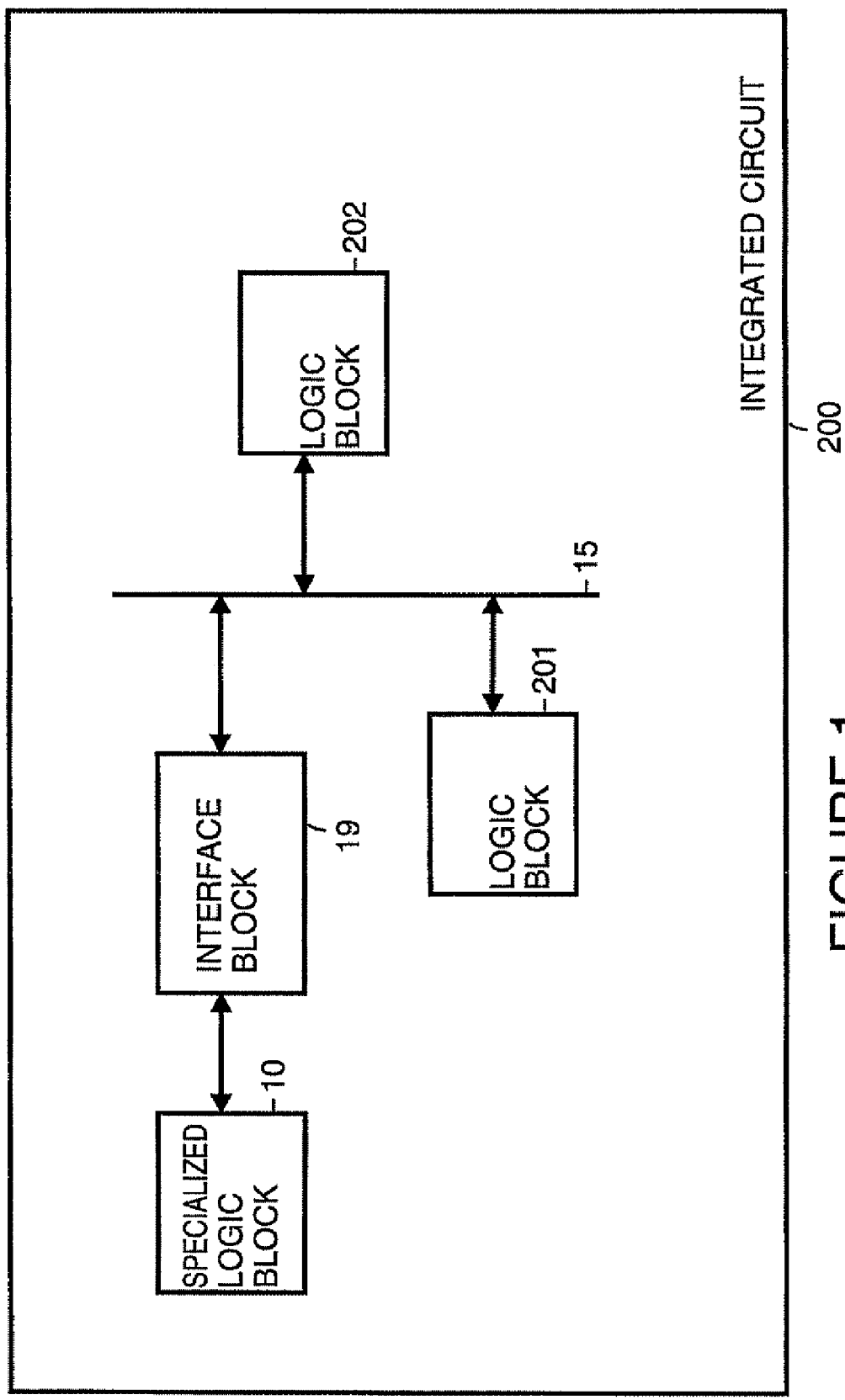
FIG. 1 is a block diagram that illustrates logic blocks within an integrated circuit connected to an on-chip bus where a specialty logic block is connected to the on-chip bus through an interface.

FIG. 1 shows an integrated circuit 200 that includes an on-chip bus 15. Attached to on-chip bus 15 are a logic block 201 and a logic block 202. A specialized logic block 10 is connected to on-chip bus 15 through an interface block 19. On-chip bus 15 operates, for example, in accordance with the HP On-chip bus protocol, developed by Hewlett-Packard Company. Alternatively, on-chip bus 15 can operate in accordance with another on-chip bus protocol, such as the Motorola M-bus protocol or the Arm AMBA bus protocol. Specialized logic block 10 is, for example a proprietary logic block that has a socket that requires interface block 19 for compatibility with on-chip bus 15. For example, specialized logic block is a logic block such as a Peripheral Component Interconnect (PCI) interface block, a memory controller, a digital signal processor or an application specific processor. For example, the block protocol used by specialized logic block 10 is a common block interface such as Sand Core Interface, a specific bus protocol (such as M-Bus protocol, or AMBA client protocol) or a virtual client protocol (such as HP-client interface, or Virtual Client Interface).

Figure 2:
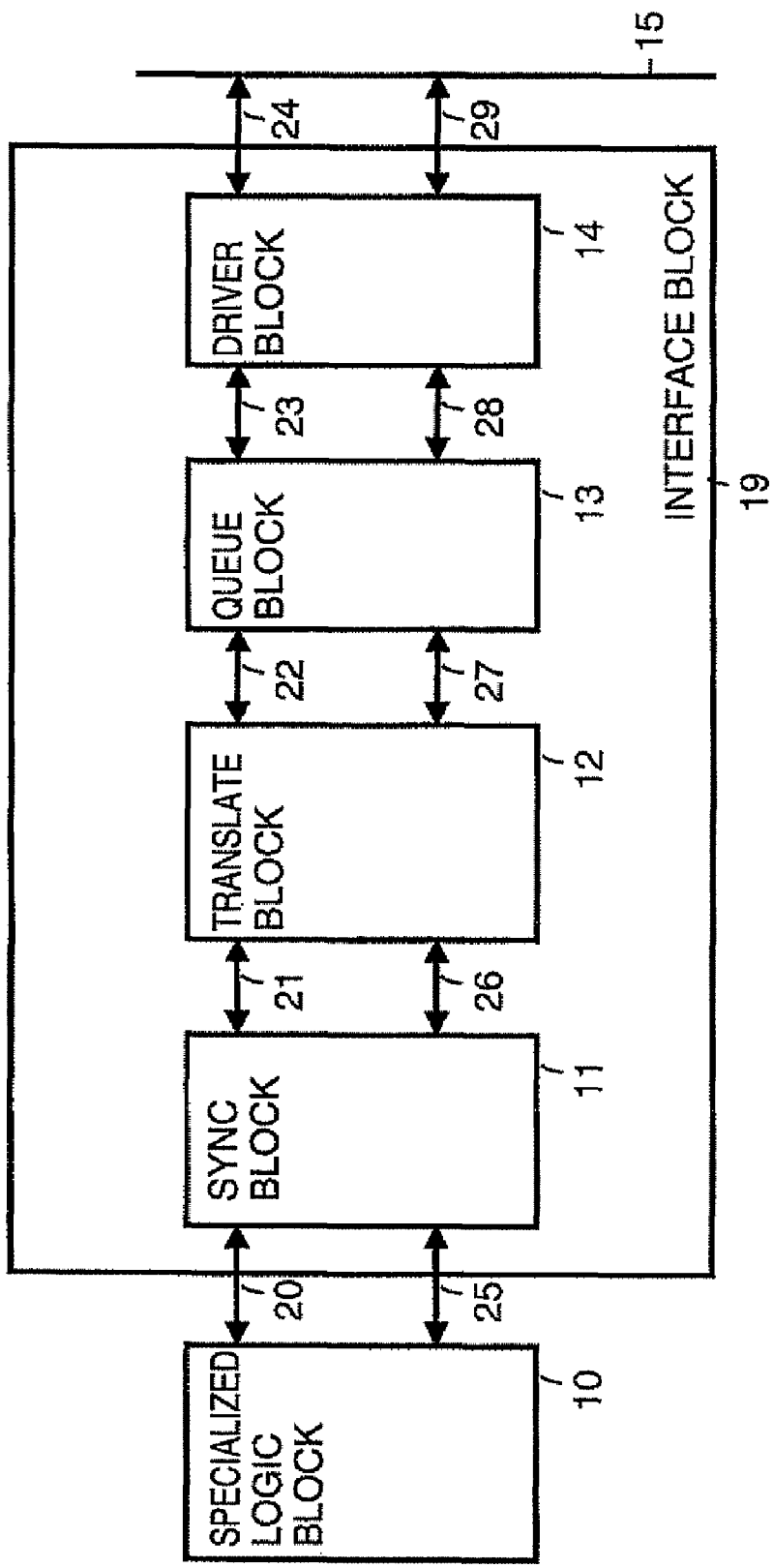

FIG. 2 shows a configurable architecture for interface block 19. The configurable architecture includes four functional stages. Each functional stage is modular and can be individually configured without grossly affecting neighboring stages.

For example, as shown in FIG. 2, a first stage is implemented as a synchronization block 11. Synchronization block 11 synchronizes data between the clock domain of logic block 10 and the clock domain of on-chip bus 15. Synchronization block 11 communicates with specialized logic block 10 utilizing a virtual socket interface protocol via control information on control lines 20 and data on data lines 25.

The second stage of the configurable architecture for interface block 19 is implemented as a translation block 32. Synchronization block 11 and translation block 12 exchange control signals synchronized to the clock domain of on-chip bus 15 via control lines 21 and exchange data signals synchronized to the clock domain of on-chip bus 15 via data lines 26. Translation block 12 converts the block encoding used by the virtual socket interface protocol of specialized logic block 10 to the block encoding used by the protocol implemented on on-chip bus 15. Logic within translation block 12 transforms requests used by the virtual socket interface protocol to equivalent bus requests for the protocol implemented on on-chip bus 15.

The third stage of the configurable architecture for interface block 19 is implemented as a queue block 13. Translation block 12 and queue block 13 exchange control signals via control lines 22 and data signals via data lines 27. Queue block 13 buffers control signals and data signals so that information from both logic block 10 and on-chip bus 15 can flow independently.

The fourth stage of the configurable architecture for interface block 19 is implemented as a driver block 14. Queue block 13 and driver block 14 exchange control signals via control lines 23 and data signals via data lines 28. Driver block 14 generates low-level electrical drive and receive specification of on-chip bus 15. Driver block 14 and on-chip bus 15 exchange control signals via control lines 24 and data signals via data lines 29.

In an alternative embodiment of interface block 19, the stages can be registered to allow pipelined access through interface block 19. This allows operation at higher clock frequencies.

Figure 3:
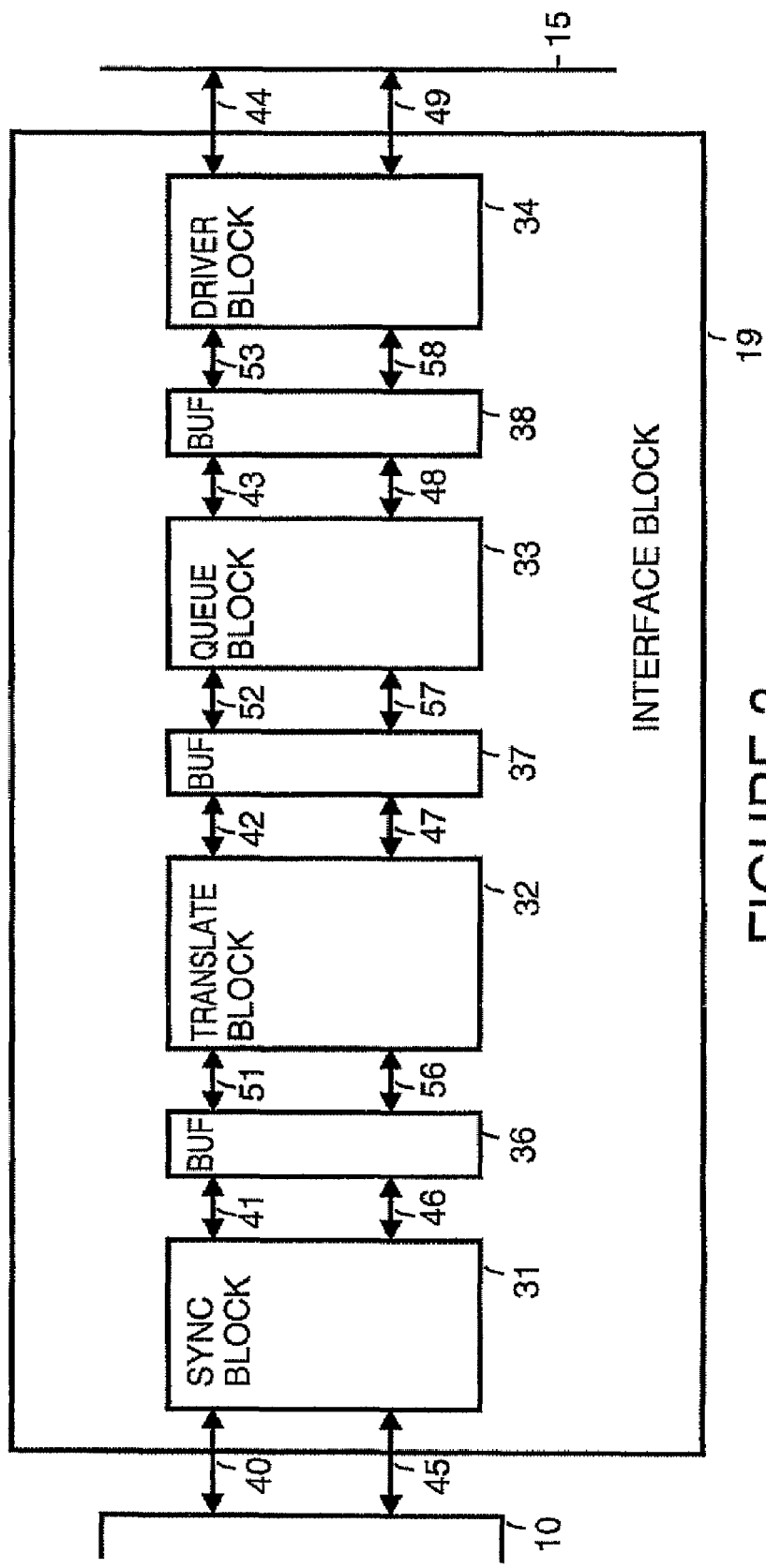

For example, as shown in FIG. 3, a first stage is implemented as a synchronization block 31. Synchronization block 31 synchronizes data between the clock domain of logic block 10 and the clock domain of on-chip bus 15. Synchronization block 31 communicates with specialized logic block 10 utilizing a virtual socket interface protocol via control information on control lines 40 and data on lines 45.

The second stage of the configurable architecture for interface block 19 is implemented as a translation block 32. A clocked buffer 36 receives and transmits control signals from/to synchronization block 31 via control lines 41 and receives and transmits data signals from/to synchronization block 31 via data lines 46. Clocked buffer 36 receives and transmits control signals from/to translation block 32 via control lines 51 and receives and transmits data signals from/to translation block 32 via data lines 46. Translation block 32 converts the block encoding used by the virtual socket interface protocol of specialized logic block 10 to the block encoding used by the protocol implemented on on-chip bus 15. Logic within translation block 32 transforms requests used by the virtual socket interface protocol to equivalent bus requests for the protocol implemented on on-chip bus 15.

The third stage of the configurable architecture for interface block 19 is implemented as a queue block 33. A clocked buffer 37 receives and transmits control signals from/to translation block 32 via control lines 42 and receives and transmits data signals from/to translation block 32 via data lines 47. Clocked buffer 37 receives and transmits control signals from/to queue block 33 via control lines 52 and receives and transmits data signals from/to queue block 33 via data lines 57. Queue block 33 buffers control signals and data signals so that information from both logic block 10 and on-chip bus 15 can flow independently.

The fourth stage of the configurable architecture for interface block 19 is implemented as a driver block 34. A clocked buffer 38 receives and transmits control signals from/to queue block 33 via control lines 43 and receives and transmits data signals from/to queue block 33 via data lines 48. Clocked buffer 38 receives and transmits control signals from/to driver block 34 via control lines 53 and receives and transmits data signals from/to driver block 34 via data lines 58. Driver block 34 generates low-level electrical drive and receive specification of on-chip bus 15. Driver block 34 and on-chip bus 15 exchange control signals via control lines 44 and data signals via data lines 49.

Figure 4:
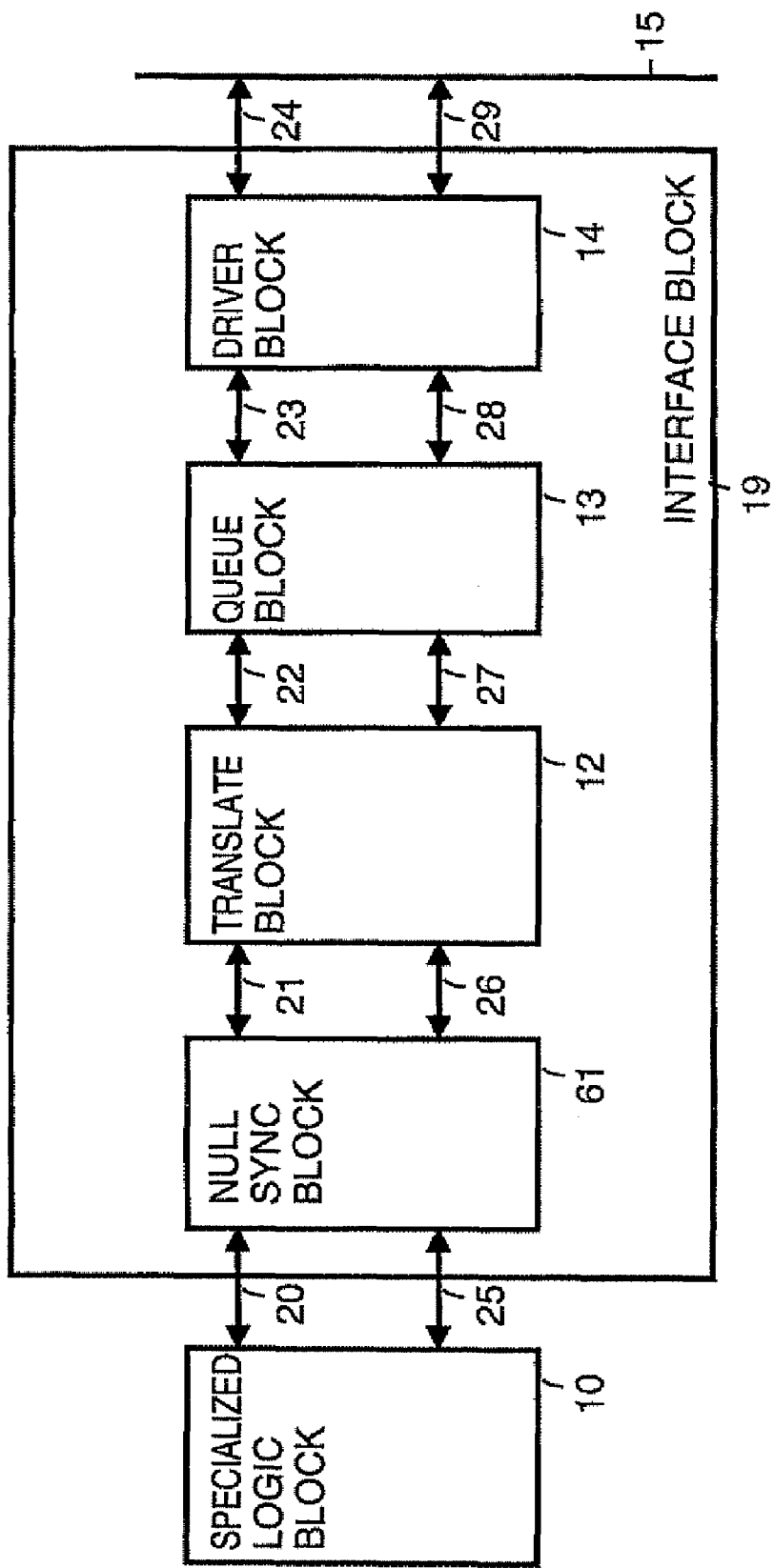

Also, in the preferred embodiments of the present invention, different stages can be swapped out depending upon the functionality required for interface block 19. For example, FIG. 4 shows the embodiment shown in FIG. 1, however, synchronization block 11 has been implemented as a null synchronization block 61. Null synchronization block 61 is used when no synchronization is needed between the clock domain of logic block 10 and the clock domain of on-chip bus 15.

Figure 5:
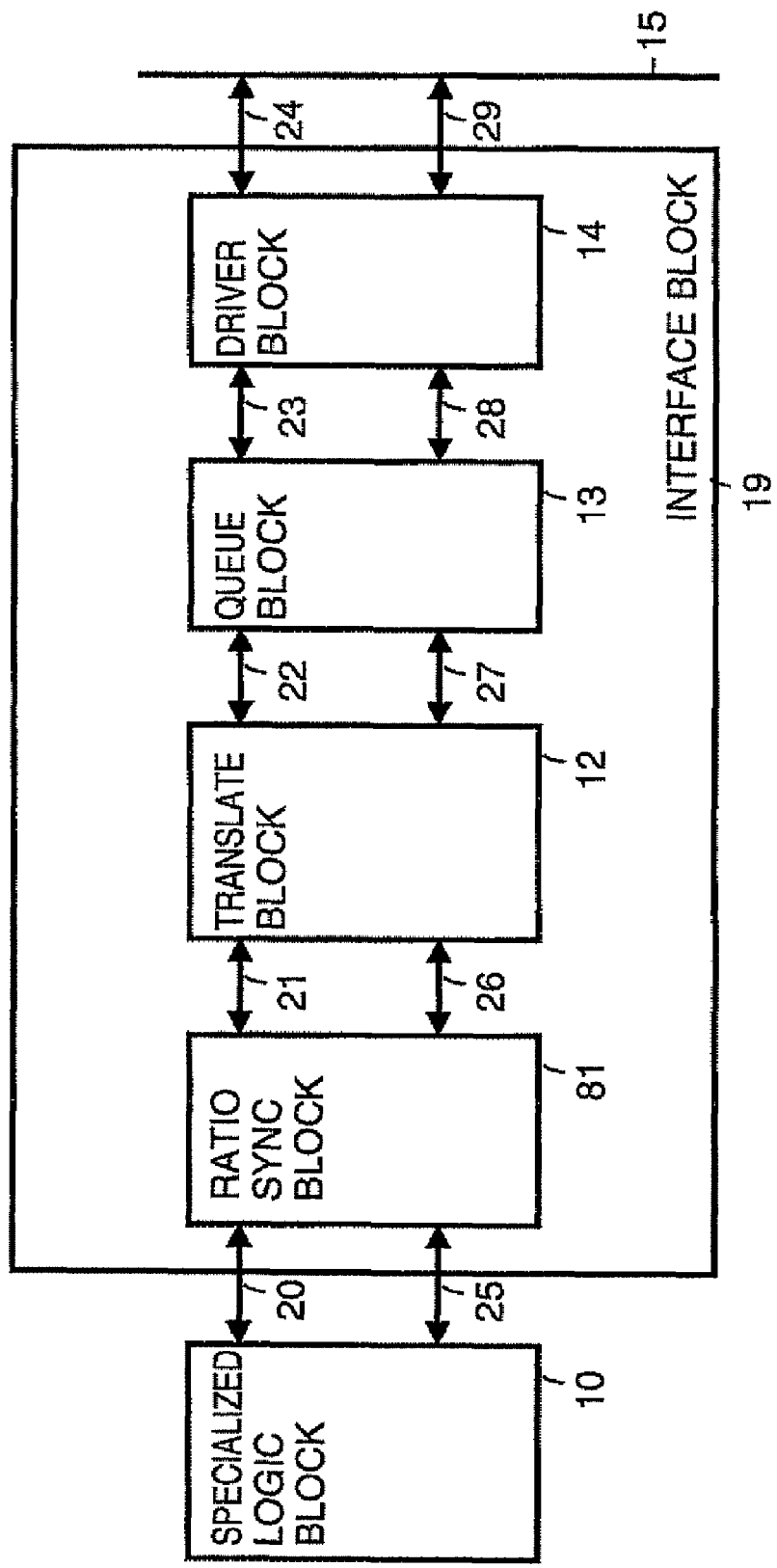

If the clock domain of logic block 10 is related to the clock domain of on-chip bus 15 by a fixed multiplier ratio, null synchronization block 61 can be replaced by a ratio synchronization block 81, as shown in FIG. 5. No other changes to interface block 19 are necessary.

Figure 6:
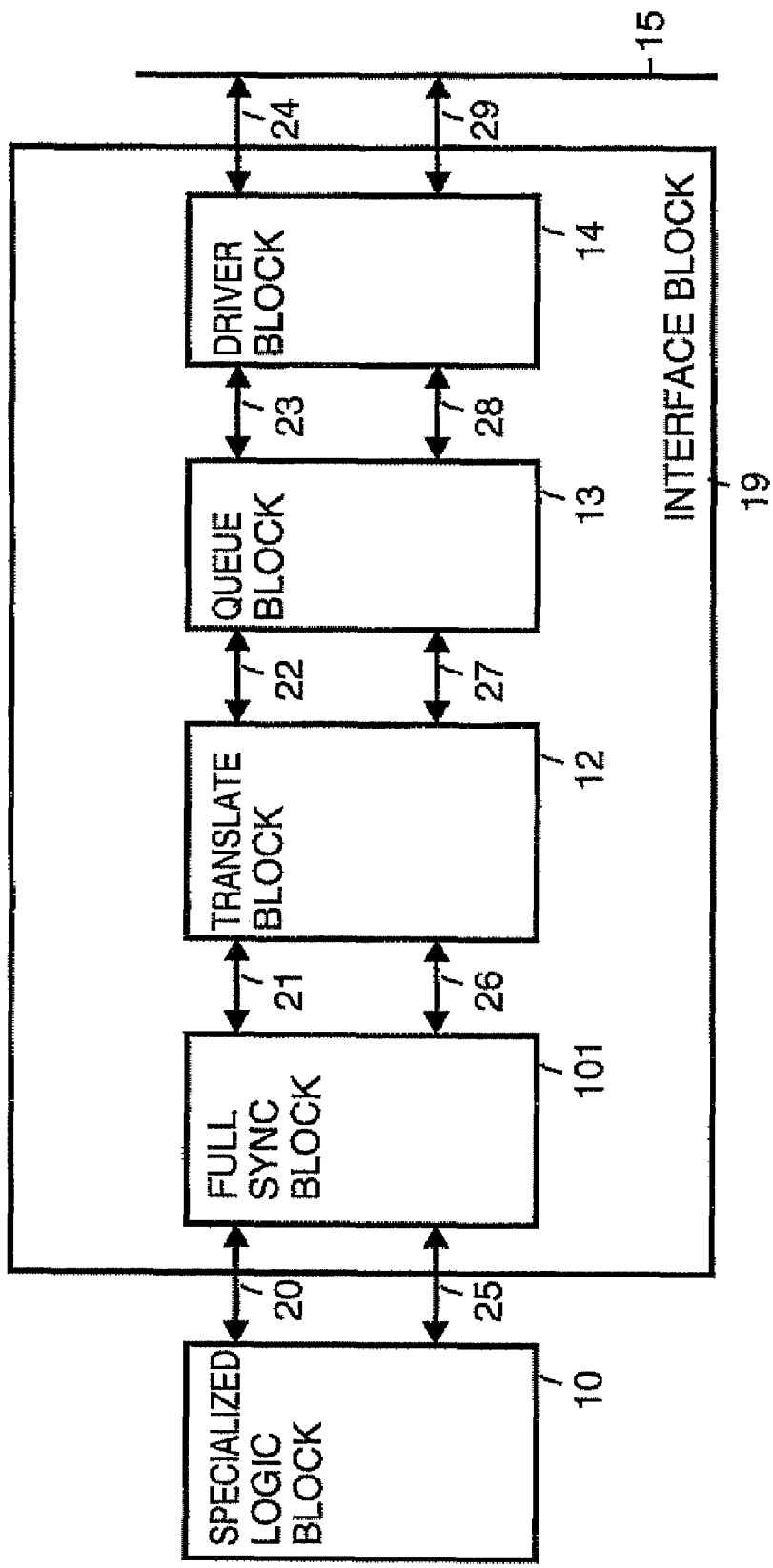

If the clock domain of logic block 10 is not phase related to the clock domain of on-chip bus 15, null synchronization block 61 or ratio synchronization block 81, can be replaced by a full synchronization block 101, as shown in FIG. 6. No other changes to interface block 19 are necessary.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. An interface block that provides an interface between an internal bus and a socket of a logic block, the interface block, the internal bus and the logic block all being located within a single integrated circuit, the interface block comprising:
   a synchronization module that performs any needed synchronization between a clock domain of the internal bus and a clock domain of the socket of the logic block;
   a translation module that, for data transferred between the internal bus and the socket of the logic block, provides translation of block encoding of the data;
   a queue module, that buffers data flowing between the internal bus and the socket of the logic block; and,
   a driver module that handles low level and electrical drive specifications of the internal bus.

2. An interface block as in claim 1 wherein the synchronization module can be implemented as one of:
   a null synchronization-block where no synchronization is required between the clock domain of the internal bus and the clock domain of the socket of the logic block;
   a ratio synchronization block where the clock domain of the internal bus is related to the clock domain of the socket of the logic block by a fixed multiplier ratio; and,
   a full synchronization block where there is no phase relationship between the clock domain of the internal bus and the clock domain of the socket of the logic block.

3. An interface block as in claim 1 additionally comprising a plurality of buffers used to pipeline the interface block, the plurality of buffers including:
   a first buffer between the synchronization module and the translation module;
   a second buffer between the translation module and the queue module; and,
   a third buffer between the queue module and the driver module.

4. A method for providing an interface between an internal bus of an integrated circuit and a socket of a logic block within the integrated circuit, the method comprising the steps of:

(a) performing any needed synchronization between a clock domain of the internal bus and a clock domain of the socket of the logic block within a synchronization module;
(b) providing any required translation of block encoding of data transferred between the internal bus and the socket of the logic block using a translation module;
(c) buffering data flowing between the internal bus and the socket of the logic block using a queue module; and,
(d) handling low level and electrical drive specifications of the internal bus using a driver module.

5. A method as in claim 4 wherein step (a) comprises the following substeps:
(a.1) using a null synchronization block where no synchronization is required between the clock domain of the internal bus and the clock domain of the socket of the logic block;
(a.2) using a ratio synchronization block where the clock domain of the internal bus is related to the clock domain of the socket of the logic block by a fixed multiplier ratio; and,
(a.3) using a full synchronization block where there is no phase relationship between the clock domain of the internal bus and the clock domain of the socket of the logic block.

6. A method as in claim additionally comprising the following step:
(e) providing buffers between modules to allow pipelined operation.

* * * * *